(12) United States Patent
Massaro et al.

(10) Patent No.: US 8,084,700 B1
(45) Date of Patent: Dec. 27, 2011

(54) PROGRAMMABLE WALL SWITCH CONTROLLER

(76) Inventors: Michael James Massaro, Collegeville, PA (US); John Dominic Massaro, Brookhaven, PA (US)

( * ) Notice: Subject to any disclaimer, the term of this patent is extended or adjusted under 35 U.S.C. 154(b) by 190 days.

(21) Appl. No.: 12/584,673

(22) Filed: Sep. 10, 2009

Related U.S. Application Data

(60) Provisional application No. 61/192,360, filed on Sep. 18, 2008.

(51) Int. Cl.
*H01H 7/08* (2006.01)
(52) U.S. Cl. .................................. 200/38 R; 307/141
(58) Field of Classification Search ............... 200/38 R, 200/38 E, 331; 315/362, 293; 307/141
See application file for complete search history.

(56) References Cited

U.S. PATENT DOCUMENTS

| | | | |
|---|---|---|---|
| 5,306,957 A | 4/1994 | Ellingham et al. | |
| 5,397,869 A * | 3/1995 | Huen | 200/330 |
| 5,465,031 A | 11/1995 | Nilssen | |
| 5,719,362 A | 2/1998 | Gray, Jr. | |
| 5,828,018 A | 10/1998 | Cooper | |

\* cited by examiner

*Primary Examiner* — Vanessa Girardi

(57) ABSTRACT

A programmable switch lever control timer device that fits over a standard wall switch with the switch lever engaged by a cam on the device. Rotational motion of the cam provided by a geared DC motor moves the switch lever arm to one of its two end-of-travel positions of operation. Programming and control means are provided by a microprocessor and motor driver circuitry. The programming and control means provides power from a battery source to the geared DC motor in accordance with a user selectable 24-hour program. Proper and accurate alignment of the switch lever and cam during installation is provided by a key-holed alignment plate that is attached to a standard wall switch cover plate prior to installing the device housing. The housing of the device attaches to the alignment plate allowing the housing to properly fit over the switch lever. All of the operating parts including a self-contained battery power source are within the device housing that fits over the standard wall switch cover plate.

9 Claims, 9 Drawing Sheets

FIG. 3a
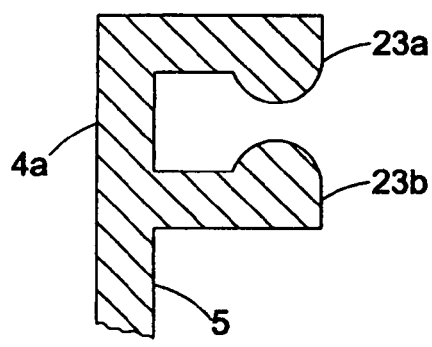
FIG. 3b
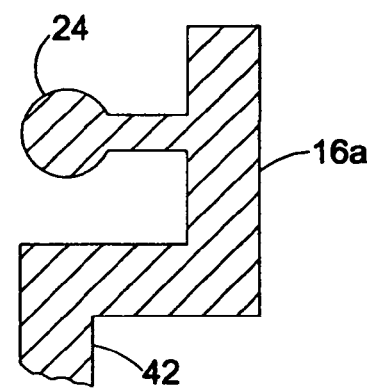
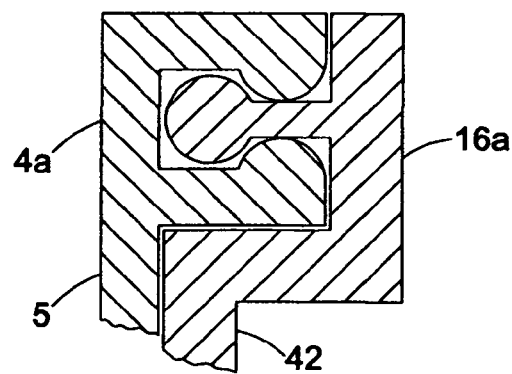
FIG. 3c

PROGRAMMABLE WALL SWITCH CONTROLLER

RELATED APPLICATIONS

This application claims benefit of Provisional Application Ser. No. 61/192,360 filed on Sep. 18, 2008.

BACKGROUND OF THE INVENTION

1. Field of the Invention

The present invention relates to an electronic programmable switch lever control timer that can activate a switch lever arm directly and automatically at preselected adjustable intervals of time to provide for programmable control of the power provided to the load normally controlled from the switch.

2. Description of the Prior Art

Several types of electronic programmable switch timers are available in the market place and many more types have been described in U.S. patent applications. Most, however, can be characterized as falling into one of two major categories, first, those devices that control the switch lever directly and, second, those devices that replace the switch altogether with another type of device. For example, U.S. Pat. No. 5,828, 018 dated Oct. 27, 1998, U.S. Pat. No. 5,306,957, dated Apr. 26, 1994, U.S. Pat. No. 5,465,031 dated Nov. 7, 1995, and U.S. Pat. No. 5,719,362 dated Feb. 17, 1998 fall into the first category. U.S. Pat. No. 5,397,930, dated Mar. 14, 1995, U.S. Pat. No. 6,531,836 B2, dated Mar. 11, 2003, U.S. Pat. No. 5,898,240 dated Apr. 27, 1999, U.S. Pat. No. 5,473,204 dated Dec. 5, 1995, U.S. Pat. No. 4,354,120 dated Oct. 12, 1982, and U.S. Pat. No. 6,121,889 dated Sep. 19, 2000 all fall into the second category.

Those electronic switch timer devices that fall into the second category have several significantly limiting characteristics: a) the use of a power triac or an electrical relay for controlling the flow of power, b) the existing electrical switch has to be removed and electrical rewiring is necessary, and c) the use of the 60 Hz power line voltage for providing the requisite time alignment for the program timer control means.

Limitations associated with the use of a power triac include inefficiency from power dissipation within the device and the requisite need for heat sinking, likely failure modes that make it difficult to obtain U.L. listing, restrictive limitations on the minimum and maximum power loads that can be controlled, and limitations on the type of load that can be controlled. Limitations associated with the use of an electrical relay are cost, the type of load that can be controlled and the maximum current that the load utilizes but its use is not as restrictive as a thryristor.

A major disadvantage of the embodiments in the second category is the need for the removal of the existing switch mechanism and its replacement with the device described in the referenced embodiments. Electrical rewiring of the existing AC wiring is necessary.

The main limitation associated with the using the 60 Hz power line voltage as the basis for keeping track of time is that of losing timing and/or accuracy of program timing as a result of the absence of the 60 Hz power signal due to power main failure/interruption and to inadvertent removal. To overcome this disadvantage, a battery-backup system has to be added to the device such that the time alignment can draw on this as a power source when needed.

Of the four patents that fall into the first category, the first, U.S. Pat. No. 5,828,018 dated Oct. 27, 1998, relates to a cover plate for a light switch with a housing that contains a rack gear system with a spring-loaded mechanical drive assembly. A standard wall switch can be activated and deactivated for a fixed length of time as determined by the amount of time to relax a helical spring that is tightened by the initial activation of a lever that extends outward from the housing. The timing is purely mechanical and is activated and deactivated as a single event. Once the lever is manually activated to turn on the wall switch, the timing mechanism is initiated and after a fixed period of time the spring mechanism deactivates the wall switch. This operation is repeated only by the manual activation of the extension lever arm. The object of this device is to allow a wall switch to be activated, for example, to turn on a hallway light and then after a fixed period of time, have the wall switch turned off to allow the hallway light to be off. This device is meant for allowing temporary, short-term activation of a wall switch and then deactivation for energy saving purposes. This device must be initiated manually.

The second patent that falls into the first category, U.S. Pat. No. 5,306,957, dated Apr. 26, 1994, relates to a device that fits over a standard wall switch cover plate with a housing that contains a slide device to engage the switch and a lever arm that extends outward from the housing to manually operate the slide to engage the standard wall switch. The housing further has a latching and catching means to retain the slide to one end of its slide path thereby keeping the wall switch in an activated position. While moving the slide, a spring means is loaded for the return action. There is also a latching release means to retract the latch from the catch means thereby releasing the slide device and allowing the slide to travel to the other end of its slide path thereby keeping the wall switch in the deactivated position. The linear travel of the slide is initially activated manually with the use of the lever arm. The latch release means comprises an electromechanical device such as a solenoid to retract the latch from the catch. The spring means then returns the slide to its original position and the wall switch is deactivated. It also mentions that a microprocessor can be used in the timing function for the release of the slide mechanism and there is an optional time interval selector for presetting a selected time interval for the timer. The timing cycle is initiated manually by movement of the slide and the device automatically executes the rest of the cycle.

The two above referenced patents that fall into the first category also have some common limitations. The significant common limitations of the two patents are mechanical complexity, each timing On-Off cycle has to be manually initiated, manual initiation of the start of the cycle is by actuation of an external lever arm, and multiple On and Off time cycles cannot be pre-programmed and initiated automatically but have to be separately initiated and programmed.

The third patent that falls into the first category, U.S. Pat. No. 5,465,031 dated Nov. 7, 1995 relates to a self-contained programmable actuator, which can be mounted directly onto the outside of the faceplate of a standard wall switch having a built-in light dimmer. The actuator can be programmed to adjust the position of the dimmer's mechanical control arm in accordance with a program that repeats on a daily basis. The actuator includes two small batteries, a miniature electric motor with a gear/linkage mechanism and an actuator frame operable to engage with and to move the dimmer's mechanical control arm over its complete range. The amount of travel of the actuator frame is controlled by the use of a switch means to count the number of rotations of the control shaft. Rotation of the motor in one direction is achieved by using a battery with one polarity. Rotation of the motor in the opposite direction is achieved by using a second battery with the opposite polarity. The device is mounted to the wall switch plate by the use of adhesive tape. Further, it is stated that upon removing the device from the switch faceplate, it may be necessary to replace the adhesive tape before re-mounting the device. For manual actuation of the dimmer switch, several keypads on the front panel must be removed to allow access to the dimmer switch.

The above referenced patent has several limitations. The gear/linkage mechanism is complex and no means is discussed by which the gear/linkage mechanism can properly and accurately engage with the switch lever arm during its installation. The amount of travel of the actuator frame has to be controlled by the use of switches and rotational counting means. Separate battery supplies are needed to allow different directions of rotation of the motor. In addition, the device is attached to the switch cover plate by the use of adhesives which may not be secure and which may have an effectiveness that decreases with age. Also, the adhesive tape may have to be replaced when removing the device from the wall switch faceplate. Such a removal operation may be necessary when there is a need to replace the batteries.

The fourth patent that that falls into the first category, U.S. Pat. No. 5,719,362 dated Feb. 17, 1998 relates to a device that fits over a standard wall switch cover plate with a housing that contains a DC motor, elliptically shaped cam, gears, and a slide plate to activate the wall toggle switch. The device is attached to the wall plate by first removing one screw of the wall plate. The device in then placed over the wall plate and the screw hole opening of the device is aligned with the hole of the screw removed from the wall plate. A longer screw is then inserted and tightened to hold the device to the wall plate. In attaching the device to the wall plate, the toggle switch arm is allowed to protrude through an opening in the slide plate. To activate the wall switch, a DC motor rotates an elliptically shaped cam which provides linear motion in an upward direction to the slide plate. The slide plate then moves the toggle switch to its up position. To deactivate the wall switch, the DC motor continues to rotate in the same direction and the elliptically shaped cam provides linear motion in a downward direction to the slide plate. The slide plate then moves the toggle switch to its down position. The amount of rotational motion must be precisely controlled to allow the slide plate to move to its extreme position of travel and to prevent the slide plate from reversing direction, moving towards its previous position and away from the desired extreme position of travel. The amount of rotational motion of the cam is controlled by the use of limit switches, one at each extreme position of travel of the slide plate. Mechanical manual override of the wall switch is achieved by first rotating a circular disk that surrounds the wall switch toggle to a position that disengages the wall switch toggle from the slide plate. The wall switch toggle arm can then be moved to its desired position.

The above referenced patent has several limitations. First, the gear/linkage mechanism is complex and the amount of rotational motion must be precisely controlled. Limit switches are used to determine the amount of rotation of the elliptical cam gear. Second, the device is secured to the standard wall plate by the use of only one screw. The means for manually operating the wall switch is not direct and takes several operations.

BRIEF SUMMARY OF THE INVENTION

In its preferred embodiment, the subject invention overcomes the disadvantages and limitations of the above referenced patents. The present invention provides a switch cover plate with an electrical timer means that activates the switch lever to its On position and to its Off position at predetermined intervals of time. Further, the present invention provides a switch cover plate with an electrical timer means that is easily installed and provides a means to accurately and properly align the actuator means with the switch lever arm. The subject invention provides a self-contained programmable timer device with a housing that fits over the standard switch cover plate. The housing contains a horseshoe shaped cam to directly engage the switch lever and the same cam is used to directly disengage the switch lever. Rotational motion of the cam in the forward direction moves the switch lever from its Off position to its On position and rotational motion of the cam in the reverse direction moves the switch lever from its On position to its Off position. Rotational motion of the cam is provided by an electromechanical means comprising a miniature geared DC motor. There is no return spring mechanism and there are no springs, latches, or catches. The wall switch is allowed to latch and catch itself in both directions. The timer has a power supply comprised of built-in batteries and has its own crystal time-base. Programming and control means are provided by the use of a microprocessor and motor power driver circuitry. The forward and reverse operations of the geared DC motor are controlled by the programming and control means which provides power from the batteries to the geared motor in accordance with a pre-settable 24 hour program. Both operations are performed electrically and electronically, no manual operation is needed to initiate either operation, and several On-Off intervals can be programmed. Program information such as present time and time occurrences for several On-Off intervals may be entered and modified by way of pushbuttons and switches contained on the front cover of the device. An indicator light is used for the indication of low voltage and for the need to replace the batteries, for indication of correct inputting of timing information, and for indication of the number of On-Off cycles successfully entered. Further, there is a switch means to allow temporary suspension of the timer operation without loss of the pre-stored programming information. This allows the timer operation to be restored without the need for re-programming.

Further, the present invention achieves proper actuation of the switch by providing accurate positioning and alignment of the device cam arms with the existing switch lever arm. This is accomplished by the use of a key-holed alignment plate. First, both cover plate screws are loosened, then the alignment plate is installed over the existing switch cover plate. The alignment plate keyholes lineup with the existing mounting screw holes of the cover plate and then both of the cover plate screws are tightened to fasten the alignment plate to the cover plate. This approach takes advantage of the fixed relationship between the cover plate screw holes, the switch lever arm, and the opening in the cover plate for the switch lever arm. The alignment plate has two mounting channels and the device housing has complementary shaped mounting strips that are designed to fit into the mounting channels. The device housing then snaps into the alignment plate and this ensures correct alignment and engagement of the device cam arms with the switch lever arm. The mounting channels and mounting strips provide a secure mechanical connection and provide fast and easy attachment and removal of the device housing to the alignment plate.

In addition, the present invention allows for direct manual operation of the exiting switch. Manual operation of the existing switch lever is achieved by use of an easily accessible lever arm that protrudes from the front of the device housing. The extended lever arm of the device is connected directly to the cam and is used to move the cam mechanically to activate and deactivate the switch under control. An optional design of the present embodiment provides for the manual activation of the existing switch electrically by the use of pushbuttons on the front surface of the device housing. The pushbutton switches activate the electromechanical means which moves the cam to activate and deactivate the switch under control. In this embodiment, no external lever arm is needed and the front housing of the device can be sealed.

The present invention also provides a means to limit the power consumption of the geared DC motor thereby extending battery life. This is provided by two different means. The microprocessor is programmed to activate the geared DC motor at the beginning of the stored On-Off time intervals. The microprocessor is further programmed to activate the geared DC motor for only a short period of time such as a few seconds. This activation time is sufficient to allow the cam arm to move the switch lever arm to its end-of-travel positions. After the switch lever arm has reached its end-of-travel positions, there is no need to continue applying power to the geared DC motor. Precise control of the amount of rotation and the position of the cam is not needed. In addition, the motor control means has electronic circuitry that is designed to limit the maximum power flow to the geared DC motor during its operation. An increase in normal operating power consumption by the geared DC motor is possible when it is stopped from rotating. This is a motor rotor-lock condition, which occurs when the cam arm moves the switch lever to its end-of-travel position and the switch mechanical stop is encountered. The geared DC motor unit that is used in the present embodiment has a safety clutch mechanism which prevents a rotor-lock condition from occurring.

Based on an anticipated use rate of three On-Off actuation intervals per day, plus occasional manual over-ride operations, and allowing the microprocessor and supporting electronic circuitry to enter into a low-activity mode of operation between activations, the batteries will last for several years before needing replacement.

BRIEF DESCRIPTION OF THE DRAWINGS

A fuller understanding of the present invention will become apparent upon consideration of the following detailed description, taken in connection with the accompanying drawings, wherein:

FIG. 3a is a cross-section of the upper mounting channel of the mounting and alignment plate.

FIG. 3b is a cross-section of the upper mounting strip of the back cover.

FIG. 3c is a cross-section of the upper mounting channel and upper mounting strip mated.

DETAILED DESCRIPTION OF THE PREFERRED EMBODIMENTS

Figure 1:
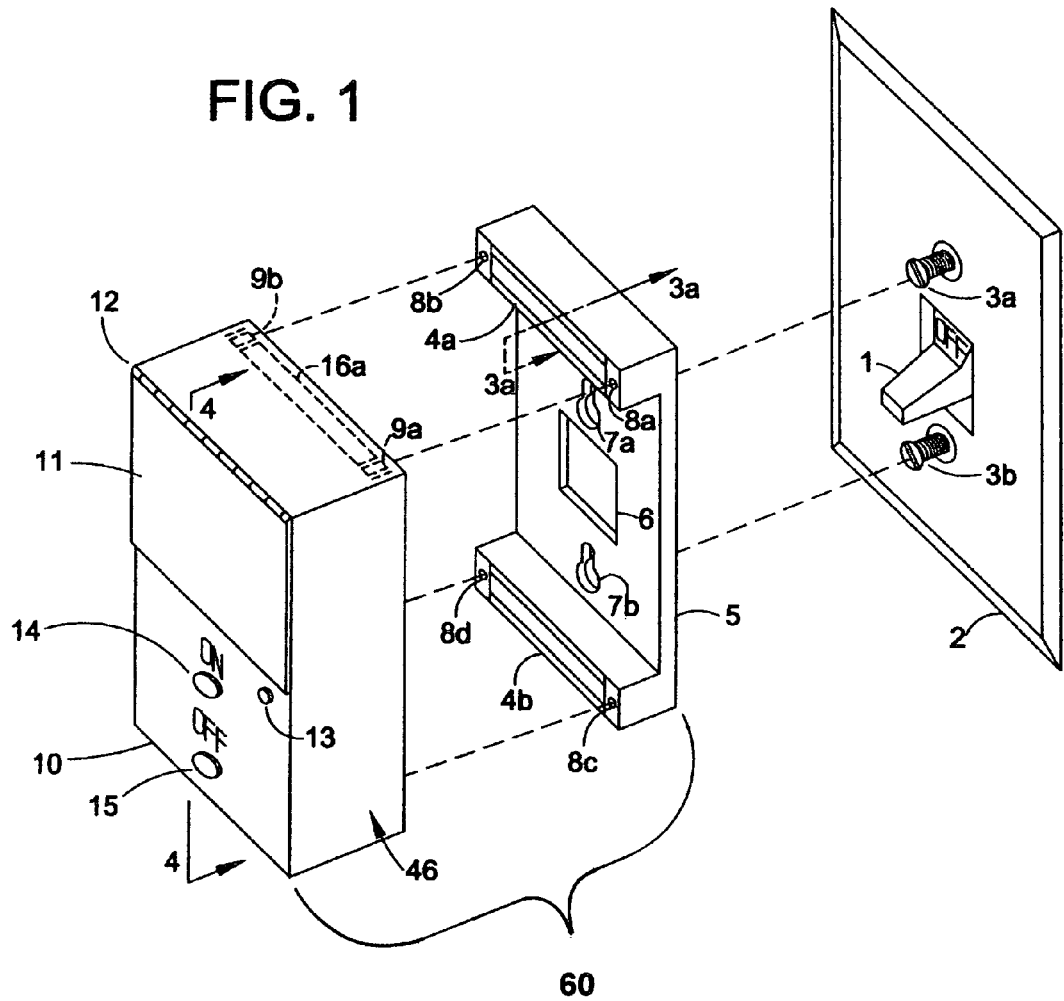
FIG. 1 is an exploded view of a standard lever switch and cover plate, the device mounting alignment plate, and the device main housing unit in accordance with an embodiment of the present invention.

FIG. 1 shows an exploded view of a standard switch lever 1, a standard switch cover plate 2 and the first preferred embodiment of the device 60 mounted to the cover plate 2. The device 60 comprises a mounting alignment plate 5 and a main housing unit 46, which is an enclosure that is comprised of a back cover 42 (shown in FIG. 2) and a front cover 10. The mounting alignment plate 5 is affixed to the switch cover plate 2 by first loosening the switch cover plate screws 3a,3b, lining up the circular holes of the keyholes 7a,7b with the cover plate screws 3a,3b and pushing the mounting alignment plate 5 against the cover plate 2 until the heads of the screws 3a,3b protrude through the keyholes 7a,7b. The alignment plate 5 is then slid in a downward direction until the shanks of the screws 3a,3b are firmly against the top slots of the keyholes 7a,7b. The screws 3a,3b are then tightened. The opening 6 in the mounting and alignment plate 5 allows the switch lever 1 to protrude through the opening 6 when the alignment plate 5 is affixed to the switch cover 2. The main housing unit 46 contains the operating electrical and mechanical parts of the invention. The main housing unit 46 is mounted and aligned to the mounting alignment plate 5 by the use of the mounting alignment plate guide holes 8a,8b,8c,8d that are located at the four corners of the mounting alignment plate 5 and by the use of the corresponding four guide pins 9a,9b, 9c,9d (shown in FIG. 2) of the back cover 42 (shown in FIG. 2). The four guide pins 9a,9b,9c,9d (shown in FIG. 2) are aligned with the guide holes 8a,8b,8c,8d and the main housing unit 46 is then pushed onto and into the alignment plate 5 until the mounting channels of the alignment plate 4a,4b and the corresponding mounting strips 16a and 16b (shown in FIG. 2) of the back cover 42 are engaged and interlocked.

The front cover 10 has a small access cover 11, which can be flipped open by the use of a hinge 12 at the top of the access cover 11. Further, there is an indicator light 13 protruding through the right top surface of the front cover 10 and there is an On pushbutton switch 14 and an Off pushbutton switch 15 on the top surface of the front cover 10. The On pushbutton switch 14 and the Off pushbutton switch 15 are used to manually operate the switch lever arm 1 by electromechanical means comprising a geared DC motor (shown in FIG. 2).

Figure 2:
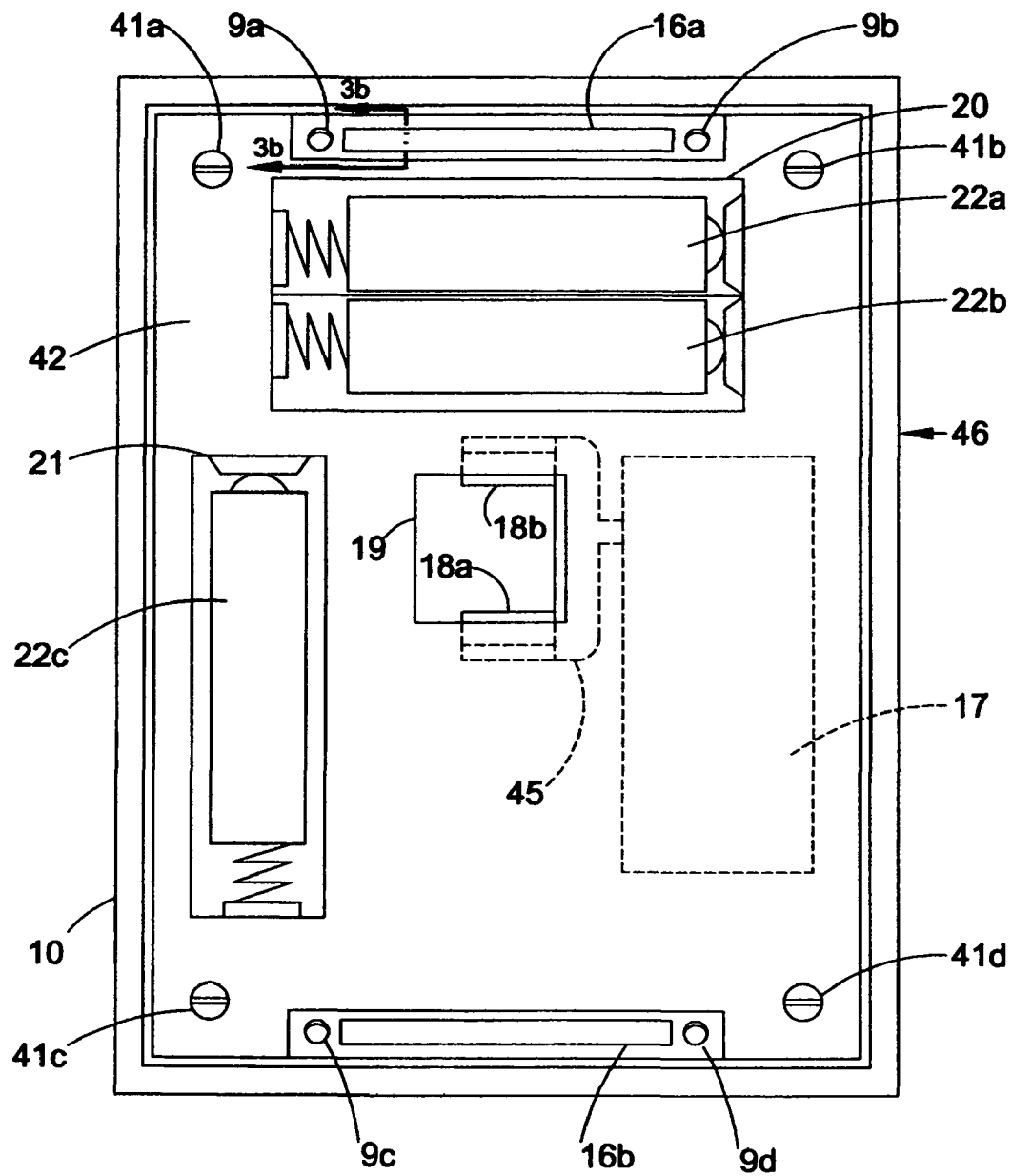
FIG. 2 is the back view of the device main housing unit showing the locations of the batteries.

FIG. 2 is the back view of the main housing unit 46 and shows the back cover 42 and the back edge of the front cover 10. The back cover 42 is attached to the front cover 10 with the use of four screws 41a,41b,41c,41d. The front cover 10 has top and bottom peripheral flanges 43a,43b (shown in FIG. 4) and left side and right side peripheral flanges 43c,43d (not shown) which allow the back cover 42 to be securely fastened to the front cover 10. The electrical power supply means of the device 60 is provided by three batteries 22a,22b,22c which are accessible and easy replaceable. The batteries 22a,22b, 22c are connected electrically in series. There is a top battery compartment and holder 20 for two batteries 22a,22b and a side battery compartment and holder 21 for one battery 22c. Further shown in FIG. 2 are the two mounting strips 16a,16b on the top and bottom of the back cover 42 which mate and interlock with the mounting channels 4a,4b on the mounting alignment plate 5. The guide pins 9a,9b,9c,9d mate with the guide holes 8a,8b,8c,8d on the mounting and alignment plate 5. The opening 19 in the back cover 42 allows the switch lever 1 to protrude into the interior of the main housing unit 46 and further allowing contact of the lower cam arm 18a and the upper cam arm 18b with the switch lever 1. The cam 45 is used to engage and activate the switch lever 1 by its rotational motion as provided by the geared DC motor unit 17. Details of the cam 45, the cam arms 18a,18b, and geared DC motor unit 17 are shown in FIG. 5.

FIG. 3a presents the cross-section of the upper mounting channel 4a of the mounting and alignment plate 5. The lower mounting channel 4b has the same cross-section. FIG. 3b is the cross-section of the upper mounting strip 16a of the back cover 42. The lower mounting strip 16b has the same cross-section. The upper mounting channel 4a of the mounting and alignment plate 5 has two jaw edges 23a,23b and the upper mounting strip 16a of the back cover 5 has a recessed prong edge 24. The jaw edges 23a,23b capture and secure the prong edge 24 when mated. The two mating surfaces have complementary surface structures and allow the securing and interlocking of the main housing unit 46 to the mounting and alignment plate 5 by pushing the back cover 42 onto the mounting and alignment plate 5. FIG. 3c shows the upper mounting channel 4a and the upper mounting strip 16a fully engaged. The prong edge 24 is recessed to allow the surfaces of the back cover 42 and mounting and alignment plate 5 to mate directly up against each other and reduce the gap between them to a minimum.

Figure 4:
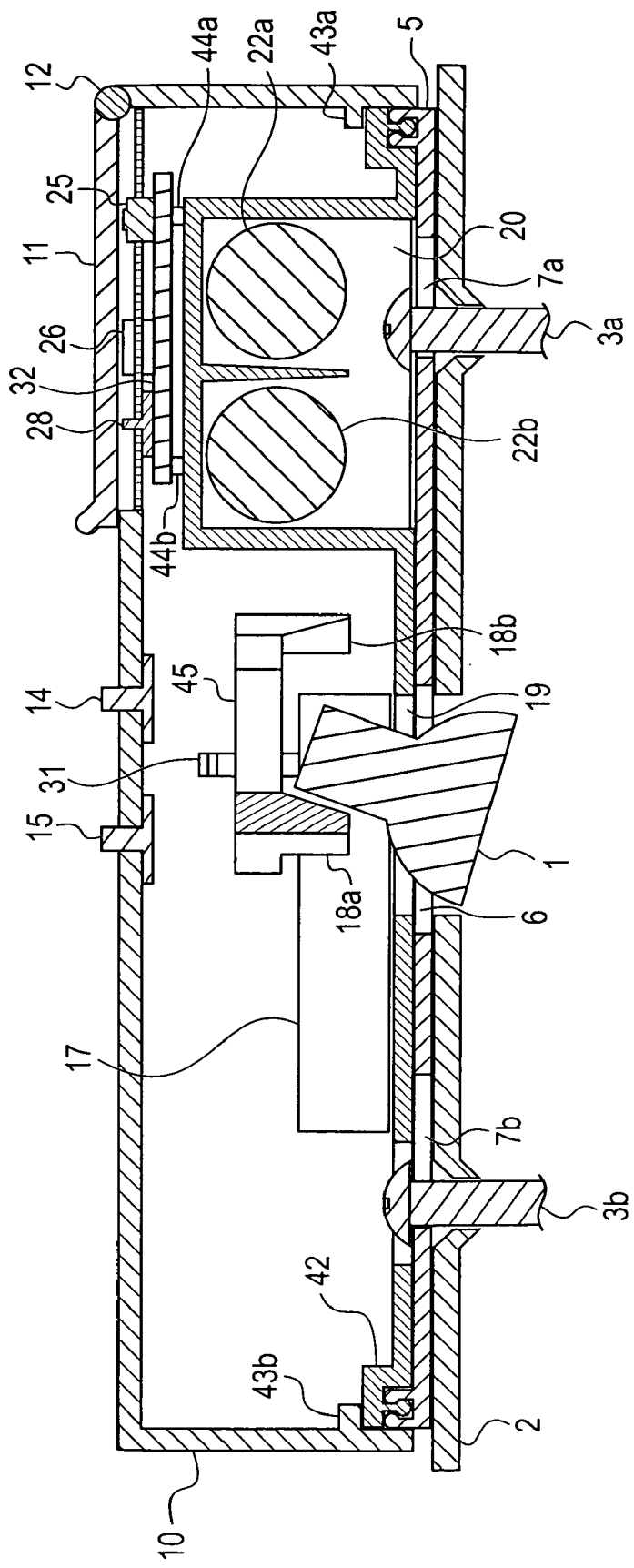
FIG. 4 is the end view of the vertical cross-section of FIG. 1 with the device mounted on the switch cover plate.

Referring now to FIG. 4, shown is the end view of the vertical cross-section of FIG. 1. This cross-section shows the top battery compartment and holder 20 and its corresponding batteries 22a,22b, and the top mounting flange 43a and bottom mounting flange 43b of the top cover 10. FIG. 4 also shows the attachment of the mounting and alignment plate 5 to the switch cover plate 2 and the attachment of the main housing unit 46, which includes the back cover 42 and the front cover 10, to the mounting and alignment plate 5. The opening 6 in the mounting and alignment plate 5 and the opening 19 in the back cover 42 are in alignment with each other and allows the switch lever arm 1 to penetrate the mounting and alignment plate 5 and protrude through the back cover 42 and into the interior of the main housing unit 46. Further, the cam arms 18a,18b are located relative to the opening 19 such that the switch lever arm 1 is positioned exactly between the cam arms 18a,18b and in the gap 57 (shown in FIG. 5) defined by the cam arms 18a,18b. The cam arms 18a,18b push the switch lever arm 1 to either of its end-of-travel operating positions by the use of the rotational motion provided by the geared DC motor unit 17. The cam 45 is attached to the drive shaft 31 of the geared DC motor unit 17. The geared DC motor unit 17 houses both a miniature DC motor (not shown) and a speed-reduction gear assembly (not shown) which reduces the speed of the drive shaft 31 relative to the speed of the DC motor (not shown) and allows a higher torque to be produced by the drive shaft 31 than that produced by the DC motor (not shown) itself.

With reference to FIG. 4, when the geared DC motor unit 17 is provided with a DC voltage across its electrical input terminals (not shown) as supplied by the batteries 22a,22b, 22c, the output drive shaft 31 will rotate. The rotating drive shaft 31 rotates the cam arms 18a,18b thereby producing contact of the lower cam arm 18a with the switch lever arm 1. The actuation of the switch lever arm 1 continues until it reaches its mechanical stop. At this point, power to the geared DC motor unit 17 is removed and the cam arm 18a comes to a resting point, which is one of the end-of-travel positions of the switch lever arm 1. In FIG. 4 the switch lever arm 1 has been moved to its upper end-of-travel position which is its On position by the cam arm 18a. To actuate the switch lever arm 1 in its other end-of-travel position, the geared DC motor unit 17 is provided with a DC voltage of opposite polarity across its electrical input terminals (not shown) as supplied by the batteries 22a,22b,22c. The output drive shaft 31 will rotate in the opposite direction thereby rotating the cam arms 18a,18b in the opposite direction. The upper cam arm 18b contacts the switch lever arm 1 and pushes the switch lever arm 1 to its other end-of-travel position until it reaches its mechanical stop. Power to the geared DC motor unit 17 is then removed and the cam arm 18b comes to a resting point which is the other end-of-travel position of the switch lever arm 1.

In FIG. 4, the printed wiring board 32 is mounted to the back cover 42 with the use of four standoffs 44a,44b, and 44c,44d (not shown). All of the electronic parts of the device including the microprocessor chip 35 (shown in FIG. 8) are mounted to the printed wiring board 32. All remaining electrical and electromechanical components are mounted to the back cover 42 with the exception of the electrical On-Off pushbutton switches 14,15 which are mounted to and accessible from the front cover 10. An alternate mounting approach is to mount the On-Off pushbutton switches 14,15 to an extension (not shown) of the printed wiring board 32. In this approach the pushbutton switches 14,15 would protrude through openings in the front cover 10. The O-T (on-time) pushbutton switch 28, the On-Off operation slide switch 25, and the 16 position rotary switch 26 are mounted to the printed wiring board 32 and protrude through openings in the front cover 10 for user accessibility. A front view of these controls is shown in FIG. 6a.

Figure 5A:
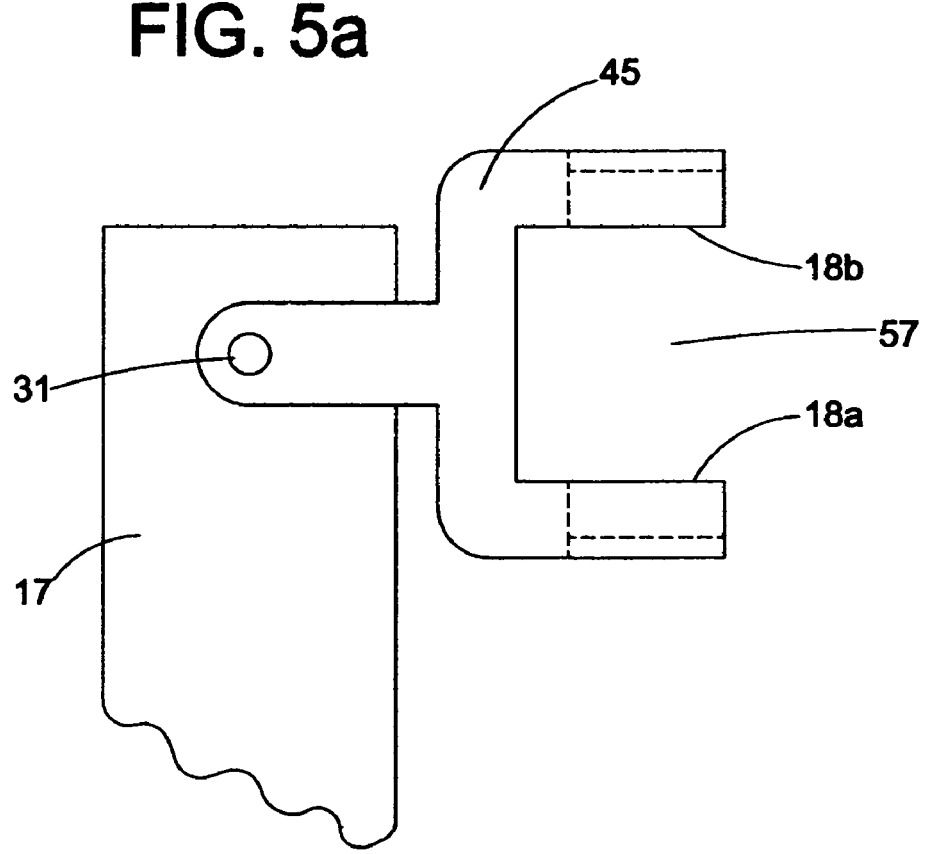
FIG. 5a is a top view of the cam and geared DC motor unit.
Figure 5B:
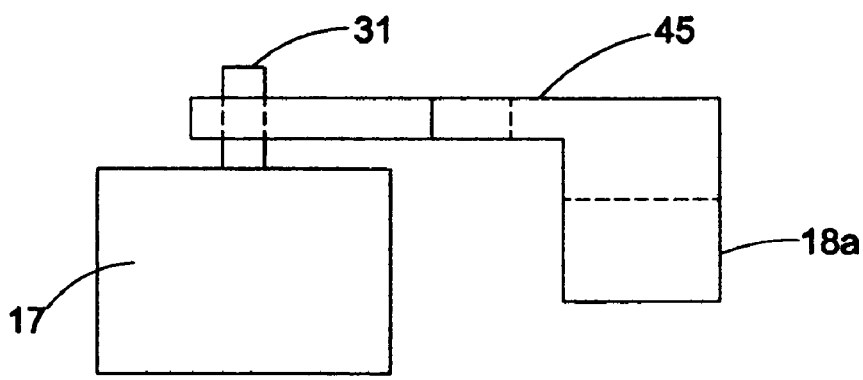
FIG. 5b is a side view of the cam and geared DC motor unit.

FIG. 5 provides details of the cam arms 18a,18b, the cam 45, and its attachment to the drive shaft 31 of the geared DC motor unit 17. FIG. 5a is the top view of the cam 45 and geared DC motor unit 17 and FIG. 5b is a side view of FIG. 5a. FIG. 5a shows the horseshoe shape of the cam 45. The upper cam arm 18b and the lower cam arm 18a define a gap 57 that accommodates the switch lever 1 under control. The cam 45 is attached to the drive shaft 31 which enables the cam arms 18a,18b to rotate in either direction. Activation of the geared DC motor 17 causes the drive shaft 31 to rotate and the cam 45 rotates with the output drive shaft 31. In FIG. 5a rotation of the cam 45 in the counter-clockwise direction is considered forward rotation and rotation of the cam 45 in the clockwise direction is considered reverse rotation. The lower cam arm 18a makes contact to the switch lever arm 1 during forward rotation of the cam 45 and the upper cam arm 18b makes contact to the switch lever arm 1 during reverse rotation of the cam 45. The cam arms 18a,18b are designed to allow optimum contact with the flat protruding surfaces of the switch lever arm 1. The cam arms 18a,18b are tapered at the bottom (shown in FIG. 4) which allows each cam arm 18a or 18b, in turn, to maintain sustained contact to the upper part of the switch lever arm 1 throughout its movement and allows the maximum leverage force to be exerted against the switch lever arm 1. The rotational direction of the geared DC motor 17 can be controlled by the polarity of the voltage applied from the batteries 22. One type of geared motor unit that can be used is Part Number GM7 marketed by Hobby Engineering, 282 Harbor Way, South San Francisco, Calif. 94080. This type of pre-packaged geared motor unit has the advantage of incorporating a clutch mechanism that temporarily disconnects the drive shaft from the gears and motor when the maximum torque output is reached. This feature protects the gears and motor from damage and prevents a rotor-lock condition by allowing the motor to continue to rotate when the drive shaft has stopped rotating.

Figure 6A:
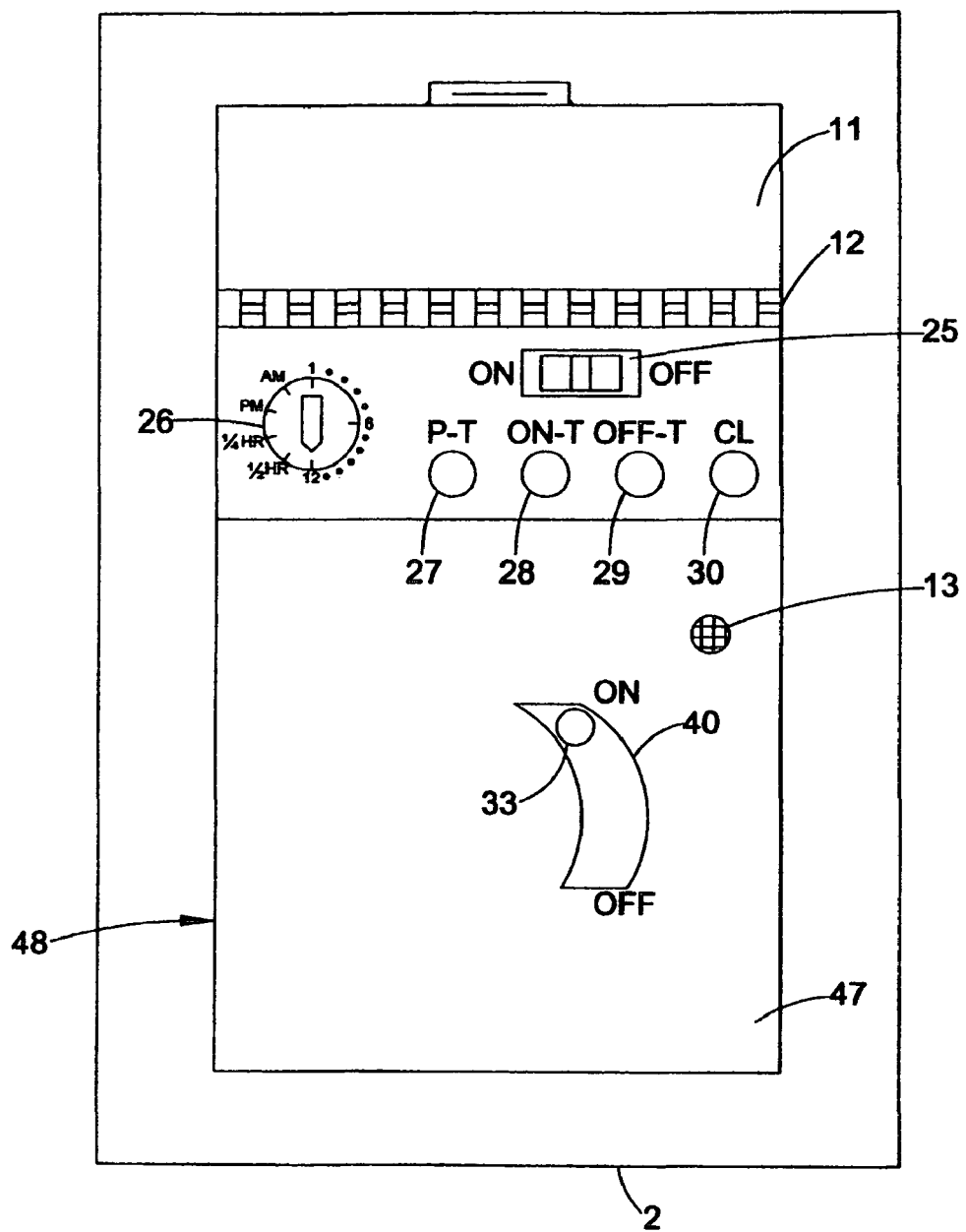
FIG. 6a is a front view of the device with a manual operation lever arm in accordance with a second embodiment of the present invention. The device is mounted on a switch cover plate and the access cover is open.
Figure 6B:
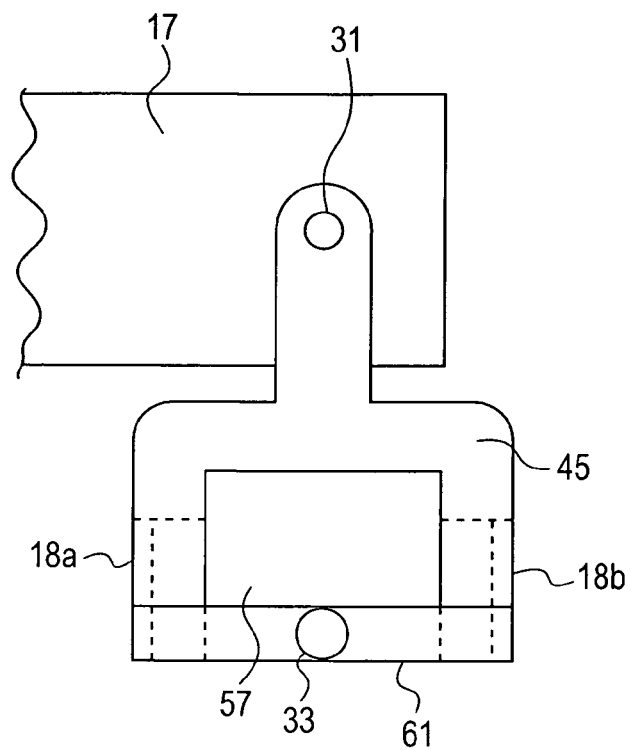
FIG. 6b is a top view of the lever arm, yoke and cam.
Figure 6C:
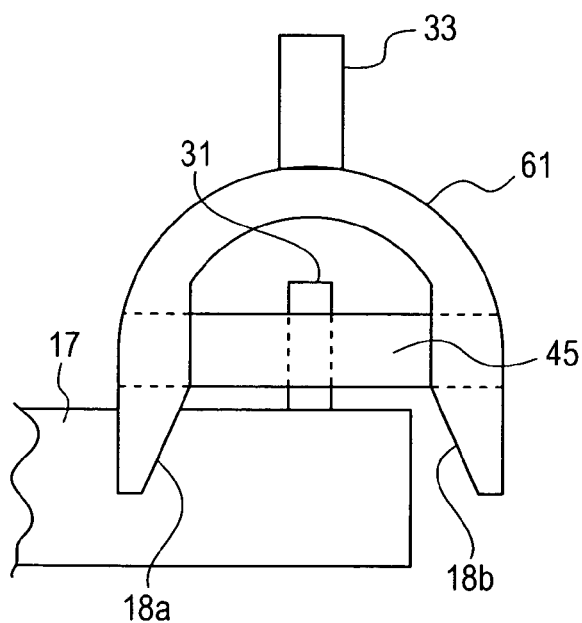
FIG. 6c is a front view of the lever arm, yoke, and cam.

FIG. 6a shows a second preferred embodiment of the present invention mounted to a standard switch cover plate cover plate 2. In this embodiment, a mechanical manual operation lever arm 33 replaces the functionality of the electrical On pushbutton switch 14 and electrical Off pushbutton switch 15 of the first embodiment. The main housing unit 48 of the second embodiment is comprised of the same back cover 42 in the first embodiment and a front cover 47 which is designed to accept a manual operation lever arm 33. The operation of the switch lever arm 1 under control is actuated directly and manually by the use of the manual operation lever arm 33. This manual lever arm 33 is used in lieu of using the two electrical manual operation pushbutton switches 14, 15. The manual operation lever arm 33 protrudes from outside surface of the front cover 47, has a path that is within the bounds of the arc shaped opening 40 through which it protrudes and allows user access. The manual lever arm 33 can be moved to the On position location in which the switch lever arm 1 is moved to its upper end-of-travel position and, conversely, movement of the manual lever arm 33 to the Off position location moves the switch lever arm 1 to its lower end-of-travel position. FIG. 6b and FIG. 6c show the manual operation lever arm 33 and its connection to the yoke 61. In FIG. 6b and in FIG. 6c the yoke 61 is attached to the cam 45 at a location that is above the ends of the cam arms 18a,18b. Movement of the manual operation lever arm 31 causes the yoke 61 to rotate the cam arms 18a,18b in the same manner as the output drive shaft 31.

Also, in FIG. 6a, the access cover 11 of the front cover 47 is open, thereby exposing the user-friendly input controls. Both of the preferred embodiments have the same set of input controls and the input control descriptions and operations also apply to both embodiments. The controls are used for providing the programming input information to the microprocessor chip 35 (shown in FIG. 8) and consist of a 16 position rotary switch 26, an On-Off slide switch 25, a P-T (present-time) pushbutton switch 27, an On-T (on-time) pushbutton switch 28, an Off-T (off-time) pushbutton switch 29, and a CL (clear) pushbutton switch 30. The 16 position rotary switch 26 is used to select and enter the four time parameters, hour, half-hour, quarter-hour, and AM or PM. The P-T pushbutton switch 27 is used to enter the present-time time parameters. The ON-T pushbutton switch 28 is used to enter the time at which the device 60 moves the switch lever arm 1 to its On position. The OFF-T pushbutton switch 29 is used to enter the time at which the device 60 moves the switch lever arm 1 to its Off position. The CL pushbutton switch 30 is used to erase all of the time information stored in the microprocessor chip 35 (shown in FIG. 8) and is activated prior to entering new time information. The On-Off operation slide switch 25 is used to temporarily stop the operation of the timer in activating and deactivating the switch lever 1.

In FIG. 6a, the indicator light 13 is controlled directly by the microprocessor 35 (shown in FIG. 8) and is activated in a flash mode of operation when the following events occur: when the battery voltage is low and the batteries need to be replaced; correct timing information has been entered at the end of the time input process cycle; and cycling of the On-Off operation slide switch 25 in which the number of flashes is an indication of the number of ON-OFF cycles successfully entered.

Programming of the microprocessor-based timer is accomplished as follows.
    a) Present time-of-day is entered by first rotating the 16 position rotary switch 26 to the present hour (1-12) and then activating the present time P-T pushbutton switch 27. To add 30 minutes and/or to add 15 minutes to the present time-of-day, the rotary switch 27 is rotated to the ½ hour position and/or to the ¼ hour position and the P-T pushbutton switch 27 is activated after each selection. The present day-of-time is completed by rotating the rotary switch 26 to either the before noon-hour AM selection or the after noon-hour PM selection. The P-T pushbutton switch 27 is activated after the selection.
    b) The On-time is entered in much the same manner except the ON-T pushbutton switch 28 is activated in place of the P-T pushbutton switch 27 in the above procedure listed in a).
    c) The Off-time is entered in much the same manner except the OFF-T pushbutton switch 29 is activated in place of the P-T pushbutton switch 27 in the above procedure listed in a).

In its preferred embodiment, the subject timer has a built-in 24-hour cycle, which is to say that whatever switching control interval pattern that is programmed into this timer will automatically repeat every 24 hours. However, it is readily possible to provide for other programming periods. For instance, a seven-day cycle can be obtained by adding a seven position rotary switch (not shown) with each position representing a particular day for selection. The present day can be programmed into the timer by selecting the present day and activating the P-T pushbutton switch 27. In a similar manner, the On time and Off time intervals of activation can be selected for various days of the week. Also, it is within the scope of the embodiments presented herein to program the microprocessor 35 (shown in FIG. 8) to change the beginning time and the end time of an On-Off time interval by small randomly selected increments of time. This is to occur for every On-Off time interval on a continuous basis. This allows the activation of the standard switch lever 1 to appear to be random in nature rather than activated at fixed, well-defined periods of time.

Figure 7:
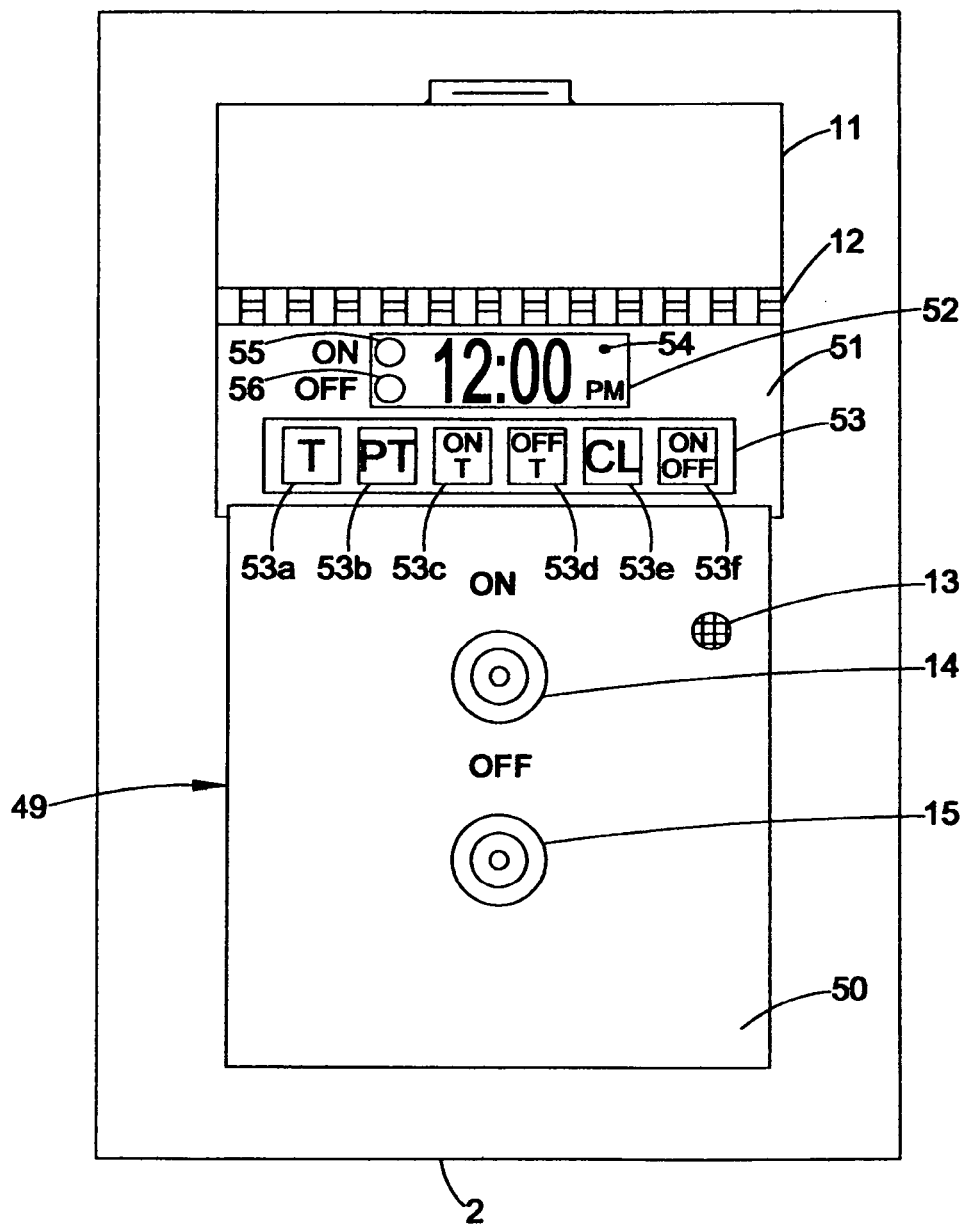
FIG. 7 is a front view of the device with a pushbutton panel and display screen module and manual operation electrical pushbuttons in accordance with a third embodiment of the present invention. The access cover is open and the device is mounted on a switch cover plate.

FIG. 7 shows a third preferred embodiment of the present invention mounted to a standard switch cover plate cover plate 2. The main housing unit 49 of the third embodiment is comprised of the same back cover 42 in the previous two embodiments and a front cover 50 which is designed to accept a display screen and pushbutton panel module 51. In this embodiment, a standardized display screen and pushbutton panel module 51 is used to display time information and to enter the information into the microprocessor 35 (shown in FIG. 8). The display screen 52 is a standard, segmented, four-digit, 12-hour clock display with a PM indicator light 54. The display screen 52 can be a conventional low power display such as an LCD or OLED type of display. The pushbutton panel 53 has five keys. The PT key 53b, the ON T key 53c, the OFF T key 53d, and the CL key 53e, are used for the same functions as the P-T pushbutton switch 27, the ON-T pushbutton switch 28, the OFF-T pushbutton switch 29, and the CL pushbutton switch 30, respectively, as in the previous two embodiments. The ON-OFF key 53f has the same function as the On-Off operation slide switch 25 used in the previous two embodiments. The ON-OFF key 53f is also electrically connected to the display screen 52 to allow activation of the ON indicator light 55 or the OFF indicator light 56 to indicate the operational status of the timer. The T pushbutton 53a is connected to the display screen and upon activation causes the display screen 52 to move forward in time. To enter the present time, the T pushbutton 53a is activated until present time is reached and then released, then the PT key 53b activated and the present time is then entered into the microprocessor 35 (shown in FIG. 8). A similar process is followed to enter the On-Off time intervals using the appropriate pushbutton keys. For this embodiment, power consumption can be conserved by removing power to the display screen 52 after activation of the pushbuttons 53 and restoring power to the display screen 52 upon activation of the pushbuttons 53. In this embodiment, there is an On pushbutton switch 14 and an Off pushbutton switch 15 to manually operate the switch lever arm 1.

Figure 8:
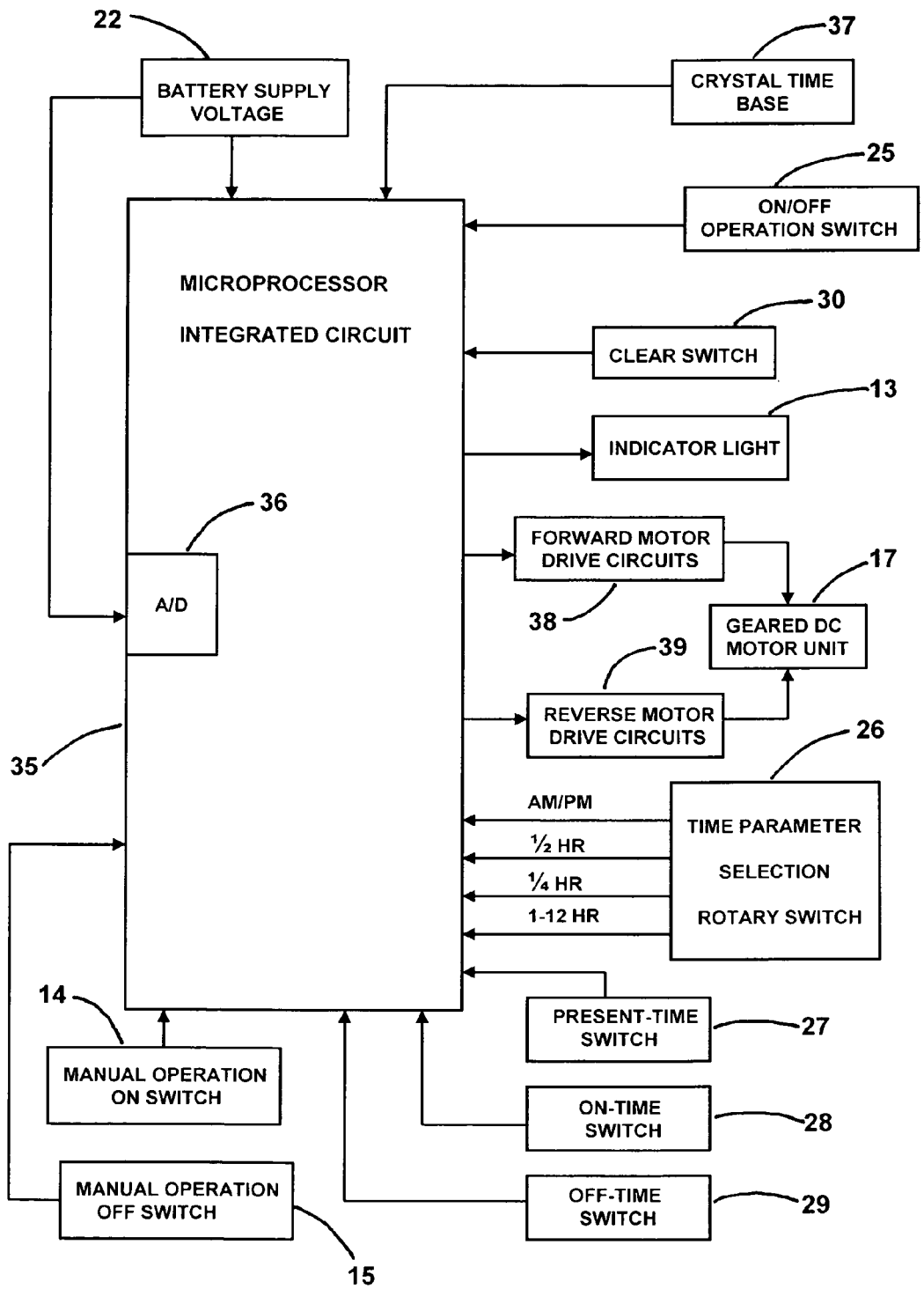
FIG. 8 is a simplified block diagram of the microprocessor and its electrical interfaces.

FIG. 8 is a simplified block diagram of the microprocessor 35 and its electrical interfaces. The microprocessor integrated circuit 35 is software programmable and has numerous Input and Output (I/O) interface ports. The microprocessor 35 is pre-programmed to compare the On-times and the Off-times stored in its memory to the current time as provided by the crystal time base 37. When the current time as provided by the crystal time base 37 corresponds to a stored time event, the microprocessor 35 is programmed to activate the switch lever 1. One type of microprocessor chip that can be used is the Part Number PIC16F690 manufactured and marketed by Microchip Technology, 2355 West Chandler Blvd., Chandler, Ariz. 85224. The operation and functionality of the diagram can best be described in terms of the different Input and Output interface signals. The preferred microprocessor 35 has a built-in A/D converter 36 and comparator circuits, which allow for the periodic sampling of the output supply voltage of the batteries 22a,22b,22c. Upon reaching a designated minimum operational voltage, the microprocessor 35, activates the indicator light 13 in a flash mode as a warning to the user that the output voltage of the batteries 22a,22b,22c is low and that the batteries 22a,22b,22c should be replaced. One of the input signal interfaces to the microprocessor 35 is the signal from the crystal time base 37, which has a 32.768 kHz output signal. This provides an accurate second, minute, and hour time base for the microprocessor 35 and is more accurate than the built-in time reference circuits (not shown) of the microprocessor 35. Another input signal interface is the On-Off operation slide switch 25. This switch allows a temporary suspension, long-term or short-term, of the operation of the device but allows the microprocessor 35 to maintain all stored present-time and On-Off cycle time information. Another input signal interface is the CL (clear) pushbutton switch 30 which when activated eliminates the stored information relating to present time and the On-Off cycle time information. The rotary switch 26 interface input signal allows selection of the four input time parameters out of a possible total selection of 16 time parameters. The four time parameters selected include a) the particular hour (one of the hours from 1 to 12), b) addition of 30 minutes (½ hour) to the hour selection, c) addition of 15 minutes (¼ hour) to the hour selection, and d) whether the time selected is in the AM or PM. The P-T (present-time) pushbutton switch 27 input signal interface is used to enter the present-time of day. This is accomplished by activating the P-T (present-time) pushbutton switch 27 after and each time one of the four input time parameters is selected. Once the present-time parameters have been entered, the microprocessor 35 maintains the current time using the signal provided by the crystal time base 37. Similarly, the On-T (on-time) pushbutton switch 28 and Off-T (off-time) pushbutton switch 29 provide input signals that are used to enter the On-time event information and Off-time event information, respectively, in the same manner as described above. All time information related to the On-time and Off-time events are stored in the microprocessor 35.

The operation of the rotary switch 26 when connected to the microprocessor 35 interface input ports is described as follows. The rotary switch 26 has four output signal terminals and a common terminal. As the rotary switch 26 is turned, the individual signal lines are connected to the common terminal in a designated pattern. With the common terminal of the rotary switch 26 connected to the negative terminal or low voltage terminal of the batteries 22a,22b,22c, the individual signal line can have a high voltage relative to the common terminal, in which the individual signal line is not connected to the common terminal, or the individual signal line can have the same or low voltage as the common terminal, in which the individual signal line is connected to the common terminal. There are 16 possible combinations of low and high voltage indications possible on the four signal lines. The initial signal configuration is all four signal lines having low voltages and the final signal configuration is all four signal lines having high voltages. The microprocessor 35 decodes the different signal configurations by the use of a stored look-up table to correctly determine which of the 16 time parameters has been selected.

Referring again to FIG. 8, the forward motor drive circuits 38 provide power to the geared DC motor unit 17 and allows the output drive shaft 31 to rotate in the forward control direction. Forward motion of the output drive shaft 31 enables the cam arm 18a to move the switch lever to its On position thereby activating the AC power load connected to the switch under control. The forward motor drive circuits 38 are activated by the microprocessor 35 when the current time matches the On-time event time stored in the microprocessor 35. The reverse motor drive circuits 39 provide power to the geared DC motor unit 17 and allow the output drive shaft 31 to rotate in the reverse direction. Reverse motion of the output drive shaft 31 enables the cam arm 18b to move the switch lever arm 1 to its Off position thereby deactivating the AC power load connected to the switch under control. The reverse motor drive circuits 39 are activated by the microprocessor 35 when the current time matches the Off-time event stored in the microprocessor 35. The microprocessor 35 is programmed to activate the motor drive circuits 38,39 for a few seconds at the beginning of each stored On-time and Off-time event interval which is sufficient operational time for the cam arms 18a,18b to move the switch lever arm 1 to its extreme positions. This measured operational time feature limits the overall power consumption. In addition, the motor drive circuits 38,39 are designed to limit the power consumption of the geared DC motor unit 17 during that short period of time when the extreme position is reached but prior to the measured operational time being reached.

In FIG. 8 manual operation of the switch lever arm 1 under control is initiated electrically by the use of the manual On pushbutton switch 14 and the manual Off pushbutton switch 15. Upon activation of the manual On pushbutton switch 14, the microprocessor 35 activates the forward motor drive circuits 38 thereby activating the geared DC motor unit 17 which in-turn moves the switch lever arm 1 to its On position and the electrical load under control is powered. Similarly, upon activation of the manual Off pushbutton switch 15, the microprocessor 35 activates the reverse motor drive circuits 39 thereby activating the geared DC motor unit 17 which in-turn moves switch lever arm 1 to its On position and power is removed from the AC load under control. The microprocessor 35 also applies the measured operational time feature to the activations of the manual On pushbutton switch 14 and manual Off pushbutton switch 15 to conserve power consumption.

FIG. 8 is also representative of the block diagram of the microprocessor 35 and its electrical interfaces for the second embodiment. For this embodiment, there is no On pushbutton switch 14 and no Off pushbutton switch 15 and the microprocessor 35 does not have the corresponding electrical interfaces to these switches.

FIG. 8 is also representative of the block diagram of the microprocessor 35 and its electrical interfaces for the third embodiment. For this embodiment, the rotary switch 26 electrical interfaces will be replaced by electrical interfaces from the display screen and pushbutton panel module 51.

We claim:

1. A device for operation of a switch, which has a switch lever movable between at least two operational positions, said device comprising:
    a housing comprising a front cover and a back cover defining an enclosure within which is contained a cam having cam rotation means, and a timer;
        a power supply operates the timer and cam rotation means;
        mounting means comprising a key-holed plate;
        means to attach the housing to the key-holed plate such that the switch lever is engaged with the cam;
        a lever arm extending outward from said housing through an opening in the front cover; wherein
    said cam further comprises means for engaging and moving the switch lever position during rotation of the cam;
    said cam manually operable with the lever arm;
    said cam rotation means comprising electromechanical means and control means, which facilitate cam rotation in a forward direction and a reverse direction;
    said timer comprising a programmable microprocessor integrated circuit which activates said cam rotation means at preset time intervals.

2. A device for operation of a switch defined by claim 1 wherein said timer further comprises pushbutton or rotary type switches.

3. A device for operation of a switch defined by claim 1 further comprising pushbutton switches on an exterior surface of said housing allow manual activation of the cam rotation means.

4. A device for operation of a switch defined by claim 2 wherein said timer further comprises switching means to stop and start program execution.

5. A device for operation of a switch defined by claim 1 further comprising a flashing light indicating replacement interval of said power supply means.

6. A device for operation of a switch defined by claim 1 wherein said control means governs power consumption of the electromechanical means.

7. A device for operation of a switch defined by claim 1 wherein said microprocessor integrated circuit electrically activates said cam rotation means at the beginning of said preset time intervals.

8. A device for operation of a switch defined by claim 1 further comprising a pushbutton panel and display screen, wherein power supply means is deactivates display means upon completion of programming operations.

9. A device for operation of a switch defined by claim 1 wherein said cam rotation means makes physical contact with the switch lever arm during movement of said switch lever arm.

* * * * *